Mar. 13, 1923.
M. BLUM.
FRUIT GATHERER.
FILED MAR. 18, 1921.
1,447,957.
2 SHEETS—SHEET 1.
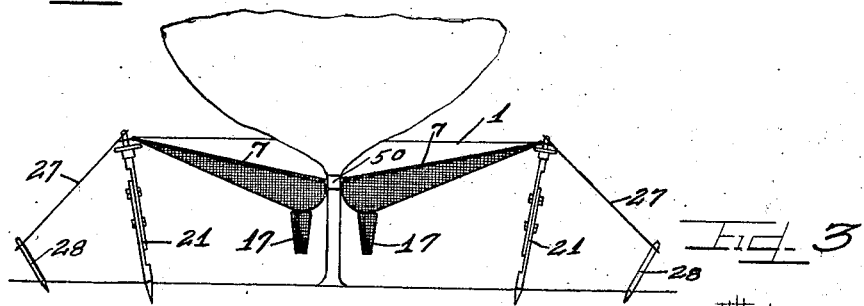
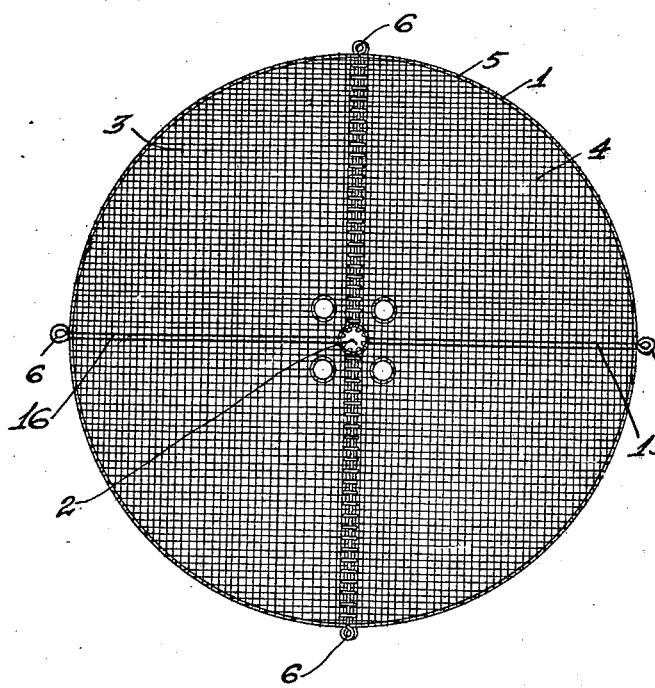
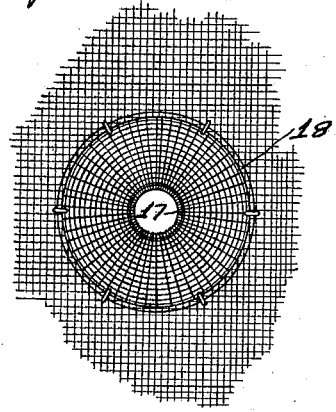
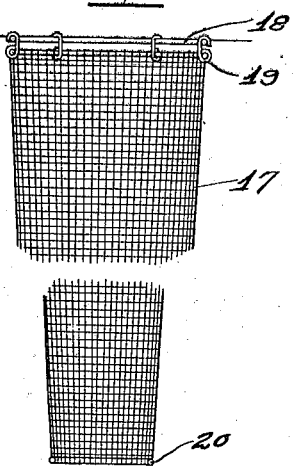
Witnesses
Rudolph T. Berg.
Inventor
Mat Blum.
By Charles W. Hires, Atty.

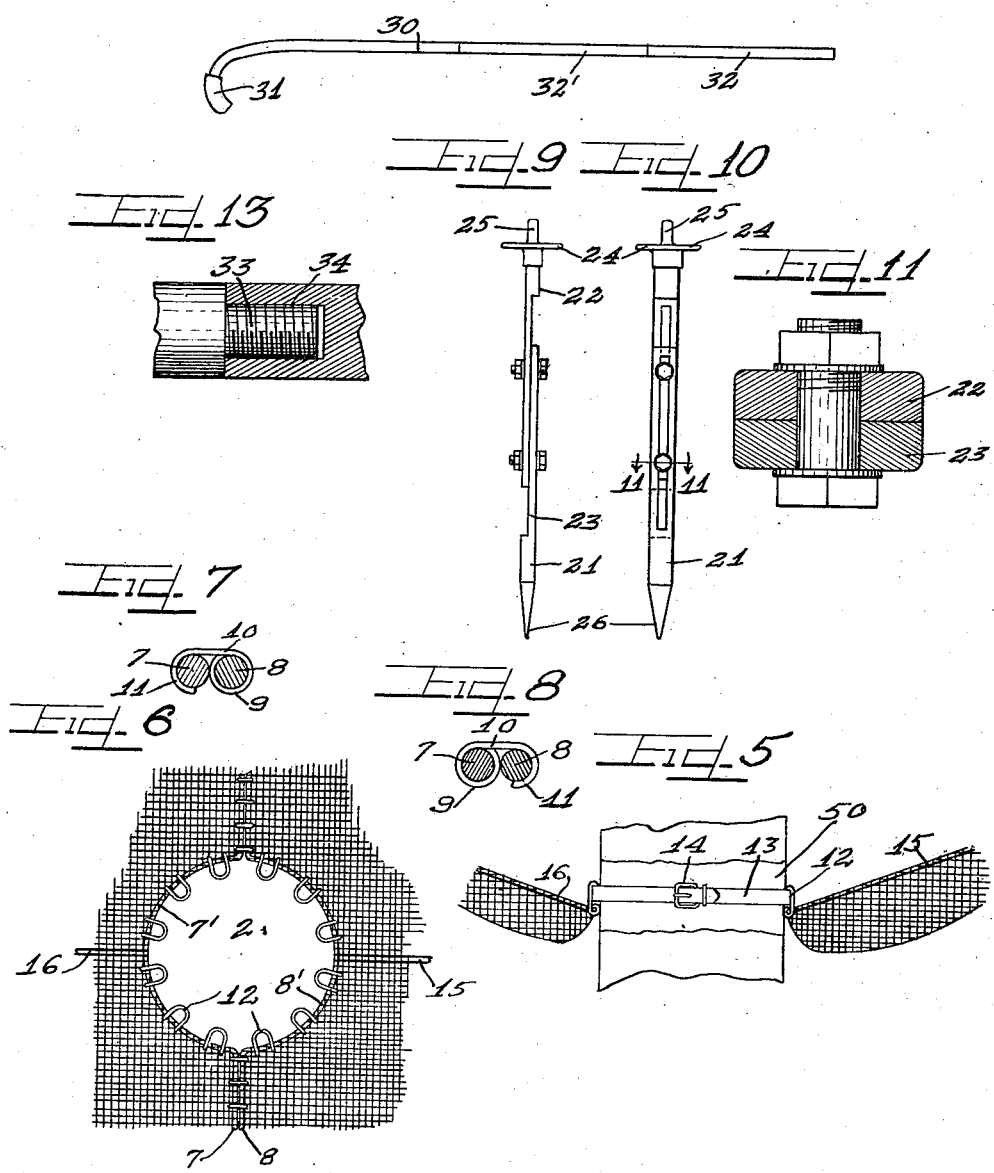

Patented Mar. 13, 1923.

1,447,957

UNITED STATES PATENT OFFICE.

MAT BLUM, OF CHICAGO, ILLINOIS.

FRUIT GATHERER.

Application filed March 18, 1921. Serial No. 453,262.

*To all whom it may concern:*

Be it known that I, MAT BLUM, a citizen of the United States, and a resident of the city of Chicago, in the county of Cook and State of Illinois, have invented a certain new and useful Fruit Gatherer; and I do hereby declare that the following is a full, clear, and exact description of the same, reference being had to the accompanying drawing, and to the numerals of reference marked thereon, which form a part of this specification.

It is the object of my invention to provide a net for catching fruit as it falls from a tree, said net surrounding the tree and supported beneath the same in such manner that the fruit as it falls thereinto will roll by gravity to a point of discharge without danger of bruising the fruit.

The invention (in a preferred form) is illustrated in the drawings and hereinafter more fully described.

On the drawings:

Figure 1 is a view of a tree showing a section of the net forming part of my invention secured beneath the same.

Figure 2 is a plan view of the net.

Figure 3 is a plan view upon an enlarged scale of the junction of the net and one of the spouts.

Figure 4 is an edge view of one of the spouts.

Figure 5 is a view of the means for attaching the inner edge of the net to the trunk of the tree showing a section of a part of the net.

Figure 6 is a plan view of a part of the net shown in Figure 5.

Figure 7 is a section showing the portion of the fastening means for the adjacent edges of two parts of the net.

Figure 8 is another section of the same pair of edges.

Figure 9 is an edge view, and Figure 10 a front view of one of the braces used to support the outer edge of the net.

Figure 11 is a section upon the line 11—11 of Figure 10.

Figure 12 is a view of the instrument used to remove the fruit from the tree.

Figure 13 is a detail partly in section showing a joint in Figure 12.

As shown on the drawings:

In practicing this invention I supply a net 1 which is to surround the trunk of a tree and be extended underneath the same. The net has a central opening 2 through which when the net is in use the trunk of the tree extends. The net is made of two portions 3 and 4, each of which is a complete semi-circle except for a semi-circular notch making part of the central opening 2. The outer edge of the net is reinforced by a hoop 5 which may be in one complete circular piece or may be in two pieces to go with the two halves of the net as is desired. At suitable points around this hoop are secured loops 6. The hoop is shown as of a rigid material but it may be of any desired material. The straight edges of the two halves of the net are also reinforced by rods or ropes 7 and 8. The ropes 7 and 8 may be continued around the edge of the opening 2 as shown at 7' and 8' or other reinforcing means for the base may be used.

A suitable padding 50 is preferably secured between the ropes 7' and 8' and the tree trunk to prevent injury thereto. Secured about the ropes 7 and 8 are a number of hooks 10, each of which includes a ring 9 completely surrounding one of these ropes and a hook 11 hooking over the other rope. These hooks are arranged alternately first with the ring on the rope 7 and the next with the ring on the rope 8 so that the two halves of the net present a series of hooks 11, to be engaged over the rope upon the other half and the hooks in one series come midways between the hooks in the other series. Secured to the reinforcement 7', 8' about the edges of the opening 2 is a series of loops 12 through which the strap 13 may be threaded. The ends of the strap can be buckled together as shown at 14 with the strap in place around the trunk of the tree. At right angles to the ropes 7 and 8 the net is reinforced by ropes 15 and 16 which are secured at their outer ends to the reinforcement 5 adjacent the loops 6. If the reinforcement 5 is formed of rigid material four loops 6, as shown, will be sufficient, but if said reinforcement is formed of flexible material, such as heavy rope, it may be necessary to increase the number of loops 6 properly to maintain the circular contour of the device.

Between the radial reinforcing ropes at that point where, when the net is in place, it will be lowest, there are holes in the net beneath each of which hangs a spout 17. Each of these holes is surrounded by a reinforcement 18 and the top of each spout has a reinforcement 19. Hooks similar to those shown in Figures 7 and 8 are supplied for fastening the spouts and the net together. The ring portion of these hooks is around the reinforcement 19 and the hook proper over the reinforcement 18 in each case instead of being alternated as were the hooks along the ropes 7 and 8. The spout is made to taper downward and the lower edge has a reinforcement 20.

A brace 21 is provided to support the net at each of the loops 6. Each of these braces consists of two parts 22 and 23 halved to overlap and slotted and provided with bolts as clearly indicated in Figures 9 and 10 for securing these two halves together in overlapping relation. The upper end of the brace is provided with a flange 24 large enough to prevent the loop 6 from descending the brace. Above the flange 24 the end of the brace projects as shown at 25 to pass through the loop 6. The lower end 26 of each brace is sharpened so that it may thrust into the ground to insure against the brace slipping. To each of the parts 25 above the loop 6 a rope 27 is attached. The other end of each of these ropes is attached to a stake driven into the ground beyond the brace from which this rope runs.

Used with this net is an instrument shown in Figure 12 consisting of a padded hook 31 at the end of a straight piece 30 which may be lengthened by additional pieces 32 secured thereto. The joint between these pieces or between the first of them and the piece 30 is of the familiar screw and socket type having a screw 33 secured to one piece and the socket 34 into which the screw is threaded formed in the other piece.

The operation is as follows:

The net 1 when taken from its storage place has the hooks 10 unfastened either along the whole diameter or along one radius thereof. If all of these hooks are fastened the first operation is to unfasten the hooks along one-half of the diameter. The net is then placed around the tree by means of this radial opening. The inner edge of the net is then raised to the desired height at the tree trunk and the strap 13 buckled around the tree. The hooks 10 are then reengaged so that the radial opening is closed. The braces 21 are then engaged in the loops 6; their pointed ends 26 are thrust into the ground somewhat nearer to the tree than the edge of the net is to be; and the length of the braces is adjusted until the height of the edge of the net is at the point desired. The ropes 27 are then attached to the upper ends 25 of the braces and to the stakes 28 which are driven into the ground still further from the tree. The ropes 27 are then tightened until the net is securely fastened in place. A basket is then placed under each spout 17.

If it is desired that the fruit should ripen on the tree until it falls either by the wind or through other natural process, the net is left in this position during the harvest season. If it is intended that the fruit should all be gathered at one time the instrument 30 is used to detach the fruit from the tree by means of the hook 31, the padding on the hook preventing injury to the tree or to the fruit. The fruit when so detached falls and lands in the net 1. It rolls down the net to the lowermost portion thereof and then enters a spout 17 through which it passes into its basket.

By referring to the drawings it will be seen that my improved construction provides a plurality of separate fruit receiving sectors, each provided with a discharge spout at its lowermost point, and while the incline from the outer edge of the net inward and downward is gradual until the spouts 17 are reached, said incline upward therefrom toward the tree trunk is much more abrupt. Thus, fruit falling from the tree will roll down the long sloping part of the net, but will be checked by the upward inclined central portion, and will be guided quickly and certainly into its spout.

When it is desired to remove the net the ropes 27 are first removed; then the loops 6 are removed from the ends 25 of the braces. The hooks 10 through one-half of the diameter are then detached and the buckle 14 opened. The net is then removed from the tree and folded up and the braces telescoped to a length convenient for storing. The net is then folded and the whole packed away. If desired, for packing, the spouts 17 may be unhooked from the edges 18 leaving a smooth net as the article to be folded.

I am aware that numerous details of construction may be varied through a wide range without departing from the principles of this invention, and I therefore do not purpose limiting the patent granted otherwise than necessitated by the prior art.

I claim as my invention:

1. In a fruit gatherer, a net, means for supporting the periphery of the net, means adapted to be secured to the trunk of a tree for supporting the central part of the net, the peripheral portion of the net being supported higher than the central portion, and radial reenforcing means extending from the central supporting means to the peripheral supporting means and dividing the net into sectors, said reenforcing means preventing the peripheral supporting means from distorting the net radially, said net sagging in each sector thereof, and said sectors inclining gradually downward from the net edge toward the center and then rising abruptly to said center.

2. In a fruit gatherer, a net, means for supporting the periphery of the net, means adapted to be secured to the trunk of a tree for supporting the central part of the net, radial reenforcing means extending from the central supporting means to the peripheral supporting means and dividing the net into sectors, said reenforcing means preventing the peripheral supporting means from distorting the net radially, said net sagging in each sector thereof, said sectors inclining gradually downward from the net edge toward the center and then rising abruptly to said center, and a spout opening into the net at the bottom of each sagging portion.

In testimony whereof I have hereunto subscribed my name in the presence of two subscribing witnesses.

MAT BLUM.

Witnesses:
  CARLTON HILL,
  JAMES M. O'BRIEN.